US009998625B2

(12) United States Patent
Matsuda

(10) Patent No.: US 9,998,625 B2
(45) Date of Patent: Jun. 12, 2018

(54) PRINTING APPARATUS CONFIGURED TO STORE IN AND PRINT IMAGE TRANSMITTED FROM EXTERNAL DEVICE

(71) Applicant: BROTHER KOGYO KABUSHIKI KAISHA, Nagoya, Aichi (JP)

(72) Inventor: Munehisa Matsuda, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days. days.

(21) Appl. No.: 15/468,678

(22) Filed: Mar. 24, 2017

(65) Prior Publication Data

US 2017/0280005 A1   Sep. 28, 2017

(30) Foreign Application Priority Data

Mar. 28, 2016 (JP) .................................. 2016-063318

(51) Int. Cl.
| | |
|---|---|
| *H04N 1/32* | (2006.01) |
| *H04N 1/00* | (2006.01) |
| *H04N 1/21* | (2006.01) |

(52) U.S. Cl.
CPC ..... *H04N 1/32448* (2013.01); *H04N 1/00204* (2013.01); *H04N 1/00344* (2013.01); *H04N 1/2104* (2013.01); *H04N 2201/0039* (2013.01); *H04N 2201/0082* (2013.01)

(58) Field of Classification Search
None
See application file for complete search history.

(56) References Cited

U.S. PATENT DOCUMENTS

| | | | |
|---|---|---|---|
| 2009/0059274 A1* | 3/2009 | Tomita | G06F 3/1204 358/1.15 |
| 2011/0255112 A1* | 10/2011 | Martin | G06F 3/1222 358/1.13 |

FOREIGN PATENT DOCUMENTS

JP   2003-019848 A   1/2003

\* cited by examiner

*Primary Examiner* — Andrew H Lam
(74) *Attorney, Agent, or Firm* — Scully, Scott, Murphy & Presser, PC

(57) ABSTRACT

A printing apparatus is configured to communicate with a terminal device via a local area network and an external device via the internet. The printing apparatus includes an input interface, a print device, and a controller. The controller is configured to perform: receiving specific image data representing the specific image from the terminal device; determining whether the input of the print instruction is required for printing the specific image; when it is determined that the input of the print instruction is required, transmitting the specific image data to the external device, receiving the print instruction via the input interface, acquiring the specific image data from the external device in response to the receipt of the print instruction, and printing the specific image with the print device.

14 Claims, 9 Drawing Sheets

PRINTING APPARATUS CONFIGURED TO STORE IN AND PRINT IMAGE TRANSMITTED FROM EXTERNAL DEVICE

CROSS REFERENCE TO RELATED APPLICATION

This application claims priority from Japanese Patent Application No. 2016-063318 filed Mar. 28, 2016. The entire content of the priority application is incorporated herein by reference.

TECHNICAL FIELD

The present disclosure relates to a printing apparatus that prints an image based on image data transmitted from an external device.

BACKGROUND

A technique of performing storage printing has been known in the art. The storage printing is a method of storing print data received from a terminal device operated by the user in an internal hard disc drive (HDD) of a printing apparatus, and printing an image in accordance with the print data when the printing apparatus receives a specific instruction. In the prior art, a printing apparatus executes printing in accordance with the print data when a password set to print data by the user in advance and a password inputted to an operation panel match with each other.

SUMMARY

In the prior art, in a state where a large amount of print data is already stored in the internal HDD of a printing apparatus, the printing apparatus sometimes cannot store newly entered print data due to shortage of capacity in the internal HDD. For this reason, there has been the possibility that the user cannot print a desired image by the storage printing.

The present disclosure has been achieved under the above circumstances. The object of the present disclosure is to provide a method of printing an image desired by the user in accordance with user input of a print instruction to the printing apparatus, even when there is no space left for storing image data in a memory of the printing apparatus.

According to one aspect, the disclosure provides a printing apparatus configured to communicate with a terminal device via a local area network and an external device via Internet. The printing apparatus includes an input interface, a network interface, a print device configured to perform printing, and a controller. The controller is configured to perform: receiving specific image data representing a specific image from the terminal device via the network interface; determining whether inputting a print instruction to the input interface is required for printing the specific image; when it is determined that inputting a print instruction to the input device is not required for printing the specific image, printing the specific image with the print device without transmitting the specific image data to the terminal device, when it is determined that inputting a print instruction to the input device is required for printing the specific image, transmitting the specific image data to the external device, receiving the print instruction via the input interface, acquiring the specific image data from the external device via the network interface in response to the receiving the print instruction, and printing the specific image with the print device based on the specific image data acquired from the external device.

According to another aspect, the disclosure provides a non-transitory computer readable storage medium storing a set of program instructions installed on and executed by a computer for controlling a printing apparatus configured to communicate with a terminal device via a local area network and an external device via Internet. The printing apparatus includes an input interface, a network interface, a print device. The program instructions include: receiving specific image data representing a specific image from the terminal device via the network interface; determining whether inputting a print instruction to the input interface is required for printing the specific image; when it is determined that inputting a print instruction to the input device is not required for printing the specific image, printing the specific image with the print device without transmitting the specific image data to the terminal device, when it is determined that inputting a print instruction to the input device is required for printing the specific image, transmitting the specific image data to the external device, receiving the print instruction via the input interface, acquiring the specific image data from the external device via the network interface in response to the receiving the print instruction, and printing the specific image with the print device based on the specific image data acquired from the external device.

BRIEF DESCRIPTION OF THE DRAWINGS

The particular features and advantages of the disclosure will become apparent from the following description taken in connection with the accompanying drawings, in which.

DETAILED DESCRIPTION

Figure 1:
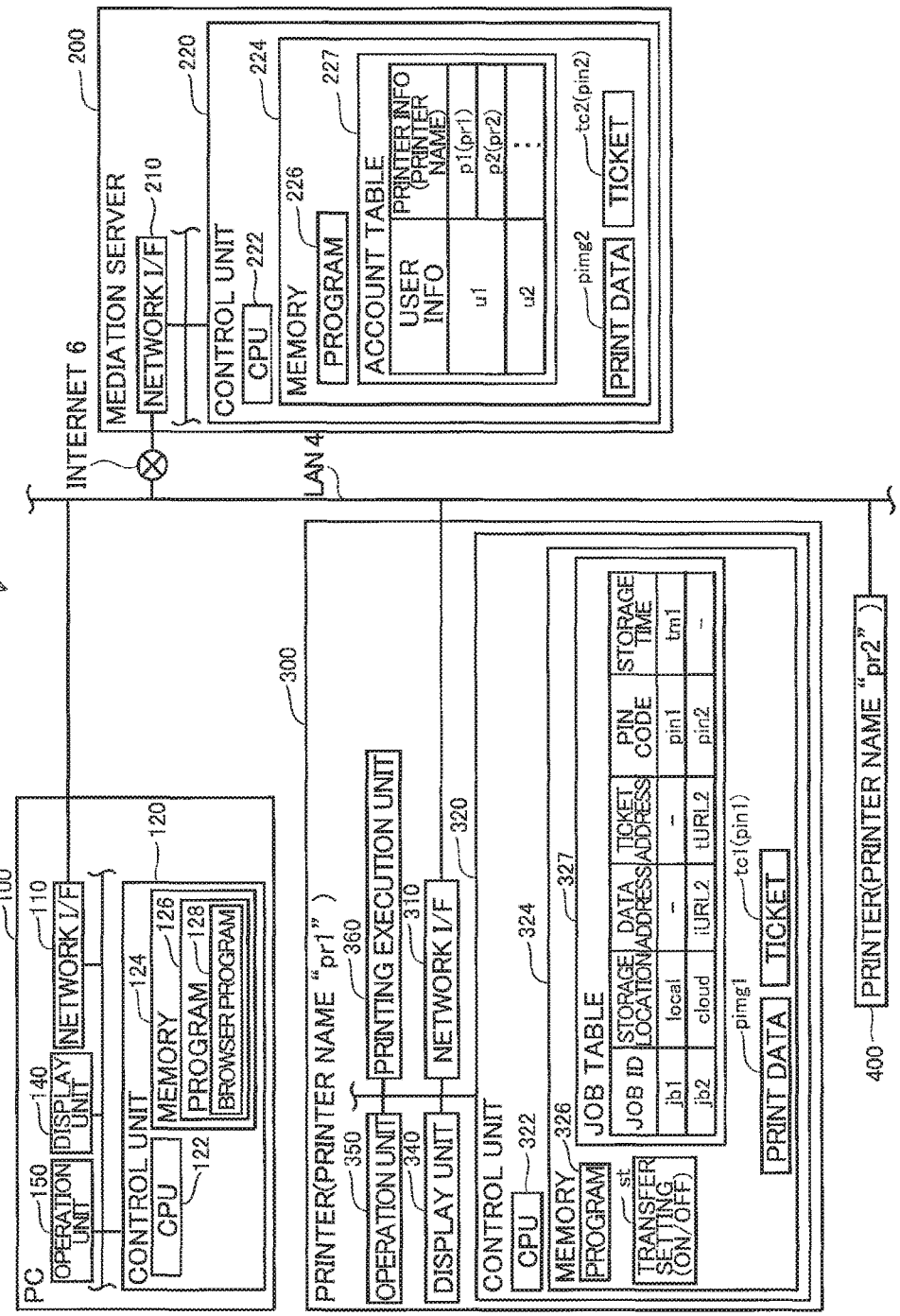
FIG. 1 is a configuration diagram of a print system according to a first embodiment.

FIG. 1 is a configuration diagram of a print system 2 according to a first embodiment. The print system 2 includes a personal computer (PC) 100, a mediation server 200, and a plurality of printers 300 and 400. The PC 100 and the printers 300 and 400 belong to the same local area network (LAN) 4. For this reason, the PC 100 and the printers 300 and 400 can communicate with each other through the LAN 4 but not through the Internet 6. The PC 100 and the printers 300 and 400 can communicate with the mediation server 200 through the LAN 4 and the Internet 6.

(Configuration of PC 100)

The PC 100 is a terminal, such as a desktop PC, a notebook PC, or a tablet PC, which is used by the user to allow the printers 300 and 400 to print an image. In a modification, the PC 100 may be a user terminal, such as a portable telephone, or a smartphone. The PC 100 includes a network interface (hereinafter referred to as the network I/F) 110, a control device 120, a display device 140, and an operation device 150. The network I/F 110 is an I/F that transmits or receives a signal through a network, such as a LAN or the Internet.

The control device 120 includes a CPU 122 and a memory 124. The memory 124 stores a program 126. The memory 124 is, for example, a RAM, a ROM, or an HDD. The CPU 122 executes a variety of types of processing in accordance with the program 126, such as a browser program 128, stored in the memory 124. The browser program 128 is a program that interprets web page data in an HTML format and displays a web page on the display device 140 of the printer 100. The browser program 128 is, for example, Google Chrome (registered trademark).

The display device 140 is a display that displays a variety of pieces of information. The operation device 150 includes a keyboard and a mouse. The user can input a variety of instructions to the PC 100 by operating the operation device 150.

The PC 100 can allow the printer 300 and 400 to execute printing (hereinafter referred to as "server printing") in response to a server printing instruction. The server printing instruction is an instruction received from the mediate server 200 through the Internet 6 when the PC 100 transmits a printing execution request to the mediate server 200 by using the browser program 128. The server printing is performed when the user of the PC 100 receives a cloud service provided by the mediate server 200 by using the browser program 128. More specifically, the PC 100 transmits a printing execution request to the mediate server 200 by using the browser program 128 when receiving a predetermined operation for printing, even if the PC 100 does not include a driver program for the printers 300 and 400. In this case, the server printing instruction is transmitted from the server 200 to the printers 300 and 400, so that the server printing can be executed by the printers 300 and 400. That is, the server printing is a mechanism of a cloud service provided from the mediation server 200.

The PC 100 can also allow the printers 300 and 400 to execute printing (hereinafter referred to as "local printing") in response to a local printing instruction. The local printing instruction is an instruction which is transmitted from the PC 100 using the browser program 128 and received by the printers 300 and 400 without passing through the Internet 6. The local printing is a mechanism based on the mechanism of the cloud service described above. That is, when the browser program 128 is adaptable to the cloud service, the PC 100, which receives predetermined operation similar to that in the server printing, transmits the local printing instruction to the printers 300 and 400 by using the browser program 128 without using the mediation server 200. In this case, the local printing can be executed by the printers 300 and 400. In other words, the local printing instruction is an instruction which is received without passing through the Internet 6 when transmitted from the PC 100 using the browser program 128, which is a program adaptable to the cloud service for executing the server printing. The server printing and the local printing can be executed by the printers 300 and 400 by using an application adaptable to the cloud service in place of the browser program 128.

The PC 100 may include, for example, a driver program that is provided by a vendor of the printers 300 and 400. In this case, the printers 300 and 400 execute printing (hereinafter referred to as "normal printing") in response to a normal printing instruction when receiving the normal printing instruction that is transmitted from the PC 100 using a driver program without passing through the Internet 6. That is, the PC 100 can allow the printers 300 and 400 to execute not only the server printing and the local printing, but also the normal printing. The normal printing is performed even when the user of the PC 100 does not use the browser program 128, or does not receive a service provided by a vendor of the mediation server 200.

(Configuration of Mediation Server 200)

The mediation server 200 is a server that mediates communication by which the PC 100 causes the printers 300 and 400 to execute printing. The mediation server 200 is installed on the Internet 6 by an operator which is different from a vendor of the printers 300 and 400. The operator is, for example, Google (registered trademark). A service provided by a printing mediation server 400 is, for example, Google Cloud Print (registered trademark). In a modification, the mediation server 200 may be a server installed by a vendor of the printers 300 and 400.

The mediation server 200 includes a network I/F 210 and a control device 220. The network I/F 210 is an I/f for transmitting and receiving signals through a network, such as a LAN or the Internet.

The control device 220 includes a CPU 222 and a memory 224. The memory 224 stores a program 226 and an account table 227. The memory 224 is, for example, a RAM, a ROM, or an HDD. The CPU 222 executes a variety of types of processing in accordance with the program 226 stored in the memory 224.

User information and printer information are stored in the account table 227 by execution of registration processing described later. The user information is information corresponding to a plurality of users, and used for logging in the mediation server 200. More specifically, each piece of user information u1 and u2 includes a user ID for identifying a user and a password for authenticating a user. The printer information is information relating to a plurality of printers. More specifically, pieces of printer information p1 and p2 include printer names pr1 and pr2 of the printers 300 and 400, capability information showing capability of a printing function which can be executed by the printers, and local settings of the printers. The local settings show a value of either one of "ON", which means that execution of the local printing is permitted in a corresponding printer, and "OFF", which means that execution of the local printing is prohibited.

The memory 224 stores print data pimg2 and a ticket tc2 by execution of storing processing described later. The ticket tc2 includes a file name of the print data pimg2, a printing condition for printing an image expressed or represented by the print data pimg2, and a PIN code pin2. The PIN code is, for example, any number of four digits. Although a detailed description will be described later, the printer 300 receives input of a PIN code corresponding to print data from the user through a display device 340 and the operation device 350. When the inputted PIN code and a PIN code stored in the account table 227 match or coincide with each other, the printer 300 can execute secure printing, in which an image represented by print data is printed in accordance with a printing condition instructed in advance.

(Configuration of Printers 300 and 400)

The printer 300 is a peripheral device (that is, a peripheral device of the PC 100) which can execute a printing function, and includes the printer name pr1. The printer 300 includes a network I/F 310, a control device 320, the display device 340, the operation device 350, and a printing execution device 360.

The network I/F 310 is an I/F for transmitting and receiving a signal through a network, such as a LAN or the Internet. The control device 320 includes a CPU 322 and a memory 324. The memory 324 stores a program 326, a job table 327, and a transfer setting st. The memory 324 is, for example, a RAM, a ROM, or an HDD. The CPU 322 executes a variety of types of processing in accordance with the program 326 stored in the memory 324. The memory 324 stores the print data pimg1 and the ticket tc1 by execution of the storing processing described later. The ticket tc1 includes a file name of the print data pimg1, a printing condition for printing an image represented by the print data pimg1, and a PIN code pin1.

The job table 327 stores a job when the storing processing described later is executed. A job includes a job ID, a storage location storing a ticket and print data, a data address, a ticket address, a PIN code, and a storage time. Each of job IDs jb1 and jb2 is information for identifying a job that is generated in response to a request received from an external device, such as the PC 100, and corresponds to a ticket and print data. The job ID jb1 corresponds to the ticket tc1 and the print data pimg1, and the job ID jb2 corresponds to the ticket tc2 and the print data pimg2. The storage location is information that shows a location in which a ticket and print data corresponding to each of the job IDs jb1 and jb2 are stored. Since a value of the storage location corresponding to the job ID jb1 is "local", the corresponding print data pimg1 and ticket tc1 are stored in the memory 324 of the printer 300. On the other hand, since a value of the storage location corresponding to the job ID jb2 is "cloud", the corresponding print data pimg2 and ticket tc2 are stored in the memory 224 of the mediation server 200.

The data address and the ticket address are uniform resource locators (URLs) showing storage locations in the memory 224 of the mediation server 200 in which corresponding print data and ticket are stored. Since the value of the storage location corresponding to the job ID jb1 is "local", corresponding data address and ticket address do not exist. On the other hand, since the value of the storage location corresponding to the job ID jb2 is "cloud", a data address iURL2 and a ticket address tURL2 are stored in the job table 327 in a manner associated with the job ID jb2. Here, the data address iURL2 is a URL showing a storage location of the print data pimg2 in the memory 224, and the ticket address tURL2 is a URL showing a storage location of the ticket tc2 in the memory 224 The PIN codes pin1 and pin2 are PIN codes included in the tickets tc1 and tc2, respectively. That is, the ticket tc2 is stored in the memory 224 of the mediation server 200, whereas the PIN code pin2 included in the ticket tc2 is also stored in the memory 324 of the printer 300. The storage time is a time at which corresponding ticket and print data are stored in the memory 324 of the printer. A job identified by the job ID jb1 whose storage location is "local" is stored in a manner associated with the storage time tm1. A job identified by the job ID jb2 whose storage location is "cloud" involves no storage time.

Transfer setting st shows a value of either one of "ON" meaning that transfer of a ticket and print data received from an external device, such as the PC 100, to the mediation server 200 is permitted, and "OFF" meaning that the transfer to the mediation server 200 is prohibited. The printer 300, when turned on for the first time after shipment, sets the transfer setting st to "ON". The printer 300, when executing initialization processing due to execution of an initialization operation on the operation device 150, also sets the transfer setting st to "ON". In the present embodiment, the transfer setting st is set to "ON".

The display device 340 is a display that shows a variety of pieces of information. The display device 340 functions also as a touch panel for receiving user operation. The operation device 350 includes a plurality of keys. The user can input a variety of instructions to the printer 300 by operating the display device 340 and the operation device 350. For example, the user can change the transfer setting st from "ON" to "OFF", or from "OFF" to "ON" by operating the display device 340 and the operation device 350. The printing execution device 360 executes processing of printing an image represented by data acquired from the outside on a print medium by a known electrophotographic method, such as an inkjet system or a laser system.

The printer 400 has a configuration similar to that of the printer 300, and has the printer name pr2.

(Operation of Print System)
(Registration Processing)

Figure 2:
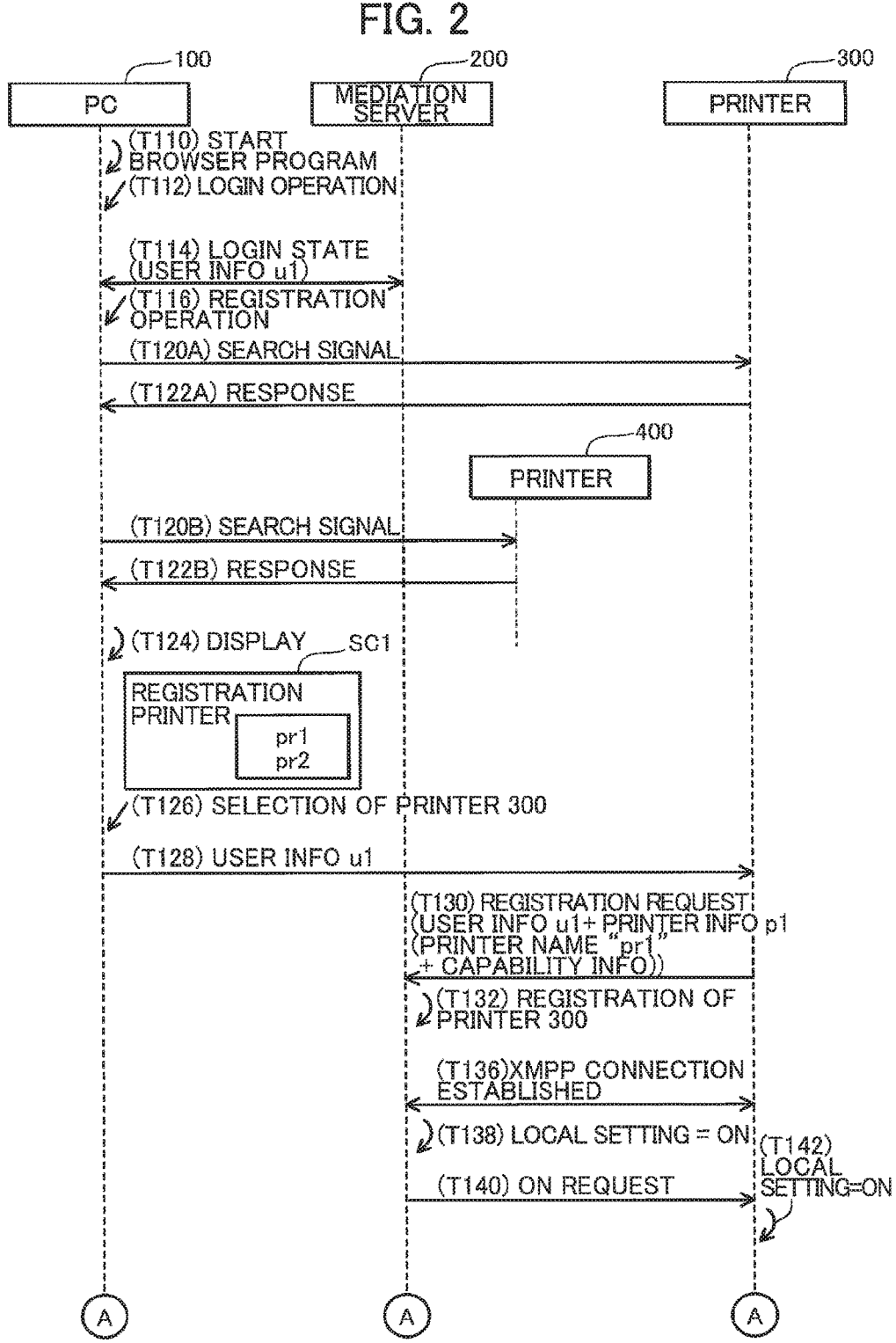
FIG. 2 is a sequence diagram of registration processing according to the first embodiment.

The following describes registration processing performed by the print system 2 in the first embodiment with reference to FIG. 2. FIG. 2 is a sequence diagram of the registration processing. The registration processing is processing for registering printer information relating to a printer in a mediation server. In the mediation server 200, the user information u1 corresponding to the user who operates the PC 100 is registered in advance.

In T110, the PC 100 starts the browser program 128 when operated by the user. Processing of T112 and subsequent processing executed by the PC 100 (and processing in FIG. 3 and subsequent processing) is performed by the browser program 128 and an OS program (not shown). In T112, the PC 100 displays a login screen for logging in the mediation server 200, and accepts a login operation for inputting the user information u1. In this case, in T114, the PC 100 uses the user information u1 to log in the mediation server 200 through the Internet 6.

In T116, the PC 100 receives a registration operation for registering printer information in the mediation server 200. The PC 100 searches for the printers 300 and 400 which belong to the LAN 4. More specifically, in T120A and T120B, the PC 100 broadcasts a search signal to the LAN 4. In T122A and T122B, the PC 100 receives a response to the search signal from each of the printers 300 and 400. Responses from the printers 300 and 400 include the printer names pr1 and pr2, respectively. In T124, the PC 100 displays a selection screen SC1 showing the two printer names pr1 and pr2 obtained through the searching.

In T126, the PC 100 receives a selection of the printer 300 (that is, the printer name pr1) through the selection screen SC1. In this case, in T128, the PC 100 transmits the user information u1 to the printer 300 through the LAN 4 without going through the Internet 6.

In T130, the printer 300 transmits a registration request to the mediation server 200 through the Internet 6. The printer 300 stores, in the memory 324, an address (URL) of the mediation server 200 used for transmitting a registration request in advance. The printer 300 uses the address as a destination to transmit the registration request to the mediation server 200. The registration request includes the user information u1 received in T128 and the printer information p1 (that is, the printer name pr1 and capability information) of the printer 300. The capability information of the printer 300 includes information showing that the printer 300 can execute the secure printing.

In T132, when authentication of the user information u1 included in the registration request is successful, the mediation server 200 registers the printer information p1 included in the registration request in a manner that the information p1 is associated with the user information u1. In T136, when receiving a notification showing that the printer information p1 is registered, the printer 300 establishes an extensible messaging and presence protocol (XMPP) connection through the Internet 6 between the printer 300 and the mediation server 200. The XMPP connection is so-called a constant connection, which maintains a state where the connection is established until the printer 300 is turned off. In this manner, the printer 300 can receive a request and a notification from the mediation server 200 on the Internet 6 by using the XMPP connection. After that, the printer 300 can execute the server printing.

In T138, the mediation server 200 switches the local setting of the printer 300 included in the printer information p1 to be stored in the mediation server 200 to "ON". In T140, the mediation server 200 transmits an ON request to the printer 300 through the Internet 6 by using the XMPP connection established in T136. The ON request is a request for switching the local setting stored in the printer 300 from "OFF" to "ON".

In T142, the printer 300 switches the local setting (not shown) stored in the memory 324 from "OFF" to "ON" upon receipt of the ON request. In this manner, the printer 300 enters a state of being able to execute the local printing.

Although not shown, the printer 400 executes the registration processing in a similar manner as the printer 300. Accordingly, in the mediation server 200, the printer information p2 including the printer name pr2, the capability information of the printer 400, and the local setting (ON) of the printer 400 is registered in a manner associated with the user information u1, and the XMPP connection is established between the printer 400 and the mediation server 200. When the local setting stored in the printer 400 is switched to "ON", the printer 400 enters a state of being able to execute the local printing.

(Storing Processing)

Figure 3:
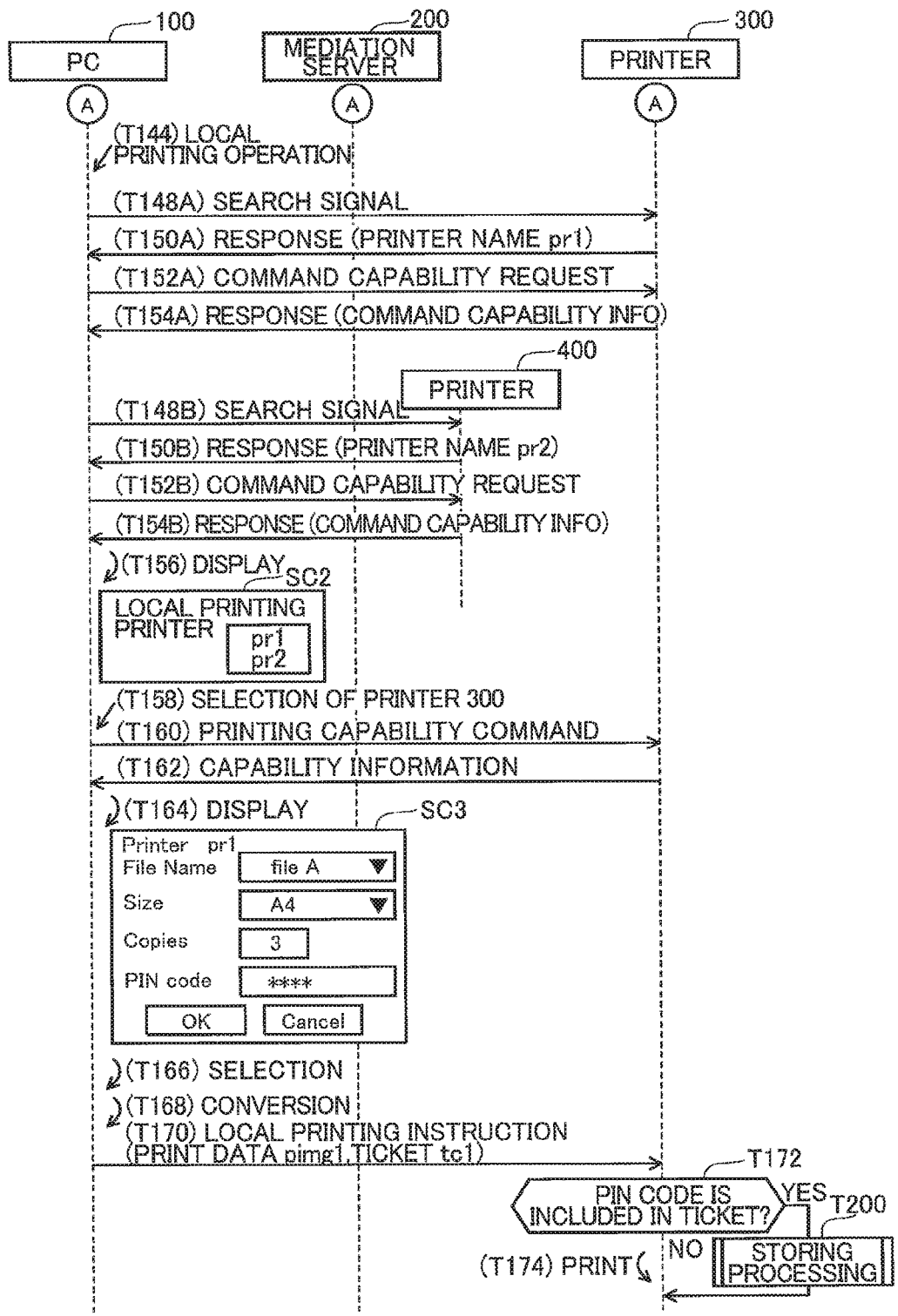
FIG. 3 is a sequence diagram of storing processing according to the first embodiment.

The following describes the storing processing performed by the print system 2 in the first embodiment with reference to FIG. 3. FIG. 3 is a sequence diagram of the storing processing. The storing processing is processing for storing image data instructed by the PC 100 and for storing information relating to a printing condition into the mediation server 200. For example, there is the possibility that, in a situation where the PC 100 does not have a driver program, the user wants the printer 300 to execute printing of an image represented by image data stored in the PC 100 by the secure printing without using the mediation server 200 on the Internet 6 (that is, without using the server printing). In this case, processing in T144 and subsequent processing is executed.

In T144, the PC 100 accepts local printing operation for executing the local printing. In this case, the PC 100 searches for a printer (for example, the printers 300 and 400) which belongs to the LAN 4. More specifically, the PC 100 broadcasts a search signal to the LAN 4 (T148A, T148B).

Upon receiving a response including the printer name "pr1" from the printer 300 in T150A, the PC 100 unicasts a command capability request to the printer 300 in T152A. The command capability request is a command for requesting transmission of the command capability information. The command capability information is information that shows whether the printer can currently use a command relating to the local printing. More specifically, the command capability information is information that shows an application programming interface (API) supported by the printer. When local printing setting of the printer is "ON", the command capability information is transmitted from the printer. When the local printing setting of the printer is "OFF", the command capability information is not transmitted from the printer. Since the local setting in the printer 300 is switched to "ON" by the registration processing, the PC 100 receives a response including the command capability information from the printer 300 in T154A. The command capability information includes, for example, an API (for example, "Capability") for executing communication of the capability information, and an API (for example, "createjob" and "submitdoc") for executing communication of image data. That is, the command capability information is information that shows capability relevant to communication of a local printing instruction.

Like the printer 300, the printer 400 transmits a response including the printer name "pr2" in T150B, and receives a command capability request from the PC 100 in T152B. Since the local setting of the printer 400 shows "ON", the printer 400 transmits a response including the command capability information to the PC 100 in T154B.

In T156, the PC 100 displays a selection screen SC2. The selection screen SC2 includes the printer name pr1 of the printer 300 as a transmission source of the command capability information and the printer name pr2 of the printer 400. A printer whose local setting is "OFF" does not transmit the command capability information to the PC 100 upon receiving a command capability request from the PC 100. That is, a printer whose local setting is "OFF" transmits a response which does not include the command capability information to the PC 100. Accordingly, in T156, a printer name of a printer whose local setting is "OFF" is not displayed on the selection screen SC2. In this manner, a printer whose local setting is "ON" is allowed to execute the local printing, and a printer whose local setting is "OFF" is prohibited from executing the local printing.

In T158, the PC 100 receives a selection of the printer 300 (that is, the printer name "pr1") between the printer 300 and the printer 400 (that is, the printer names "pr1" and "pr2") through the selection screen SC2. In this case, in T160, the PC 100 transmits a printing capability command to the printer 300. The printing capability command is, for example, a command in accordance with the API "Capability" included in the command capability information in T154A, and is used for requesting transmission of the capability information. In T162, the printer 300 transmits printing capability information of the printer 300 to the PC 100 in response to the capability command.

In T164, the PC 100 generates screen data showing a selection screen SC3 by using the capability information, and displays the selection screen SC3. The selection screen SC3 is a screen for selecting image data to be printed and a printing condition. In this manner, the user can select a desired piece of image data (for example, image data img1) from a plurality of pieces of image data stored in the PC 100. The selection screen SC3 is configured so that a printing condition made up of a paper size and the number of copies can be selected within a range of the capability information of the printer 300. In this manner, the user can select a desired printing condition. The printing condition may include the number of colors for printing, a printing resolution, a paper size, and a setting of two-sided printing, in addition to the printing conditions described above.

As described above, the capability information of the printer 300 includes information showing that the printer 300 can execute the secure printing. For this reason, the selection screen SC3 includes a text box for inputting a PIN code. In printing processing to be described later, the printer 300 prints an image which is represented by image data selected on the selection screen SC3 when a PIN code designated by the user on the selection screen SC3 coincides with a PIN code inputted to the printer 300 in the printing processing. Accordingly, the user can allow the printer 300 to print a desired image by the local printing and the secure printing by performing a local printing operation on the PC 100 in T144 and inputting a PIN code on the selection screen SC3 in T166 described later. The user does not have to input a PIN code. In this case, printing of the image is executed in accordance with image data transmitted to the printer 300 without the authentication of a PIN code performed in the secure printing when image data is stored in the mediation server 200 like in the normal local printing. In a modification, the configuration may be such that the selection screen SC3 includes a check box for designating the secure printing, and data may be inputted to the text box when the check box is checked.

In T166, the PC 100 receives a selection of image data, a printing condition, and a PIN code through the selection screen SC3. The user selects image data in accordance with a file name displayed on the selection screen SC3, selects a printing condition made up of a print size and the number of copies, inputs an arbitrary PIN code, and presses an "OK" button. Since the PIN code is highly confidential information, the code being inputted is displayed as "****". In this case, in T168, the PC 100 converts the selected image data img1 on the basis of the selected printing condition by using the browser program 128, and generates the print data pimg1 in a data format which can be interpreted by the printer 300. The data format is, for example, printer working group (PWG)-Raster format. The printing condition includes conditions of a printed paper size and the number of copies. However, the number of copies, which is the number of images to be printed by the printer 300 in accordance with the print data pimg1, is a condition that is not used when the mediation server 200 generates the print data pimg1. Accordingly, the mediation server 200 generates the print data pimg1 in accordance with a condition of a print size included in the printing condition.

In T170, the PC 100 transmits a printing instruction including the print data pimg1 and the ticket tc1 to the printer 300. The printing instruction is, for example, a command according to the APIs "createjob" and "submitdoc" included in the command capability information in T154A, and used for instructing the execution of the local printing. The ticket tc1 includes the printing condition and the PIN code pin1 selected in T166.

In T172, the printer 300 determines whether or not a PIN code is included in the ticket tc1. In this manner, the printer 300 determines whether or not an image represented by the print data pimg1 should be printed by the secure printing. For example, when a PIN code is not included in the ticket received in T170, the printer 300 determines that the image should not be printed by the secure printing (NO in T172), and, in T174, the print data is supplied to the printing execution device 106 so that the printing execution device 106 is allowed to execute printing of an image represented by the print data. In this manner, the user can allow the printer 300 to execute the printing (that is, the normal local printing) of an image represented by image data stored in the PC 100, by using the browser program 128 and without using the mediation server 200 on the Internet 6. Since the PIN code pin1 is included in the ticket tc1, the printer 300 determines that the image represented by the print data pimg1 should be printed by the secure printing (YES in T172), and the image is not printed and the storing processing (FIG. 4) is executed in T200.

(Storing Processing)

Figure 4:
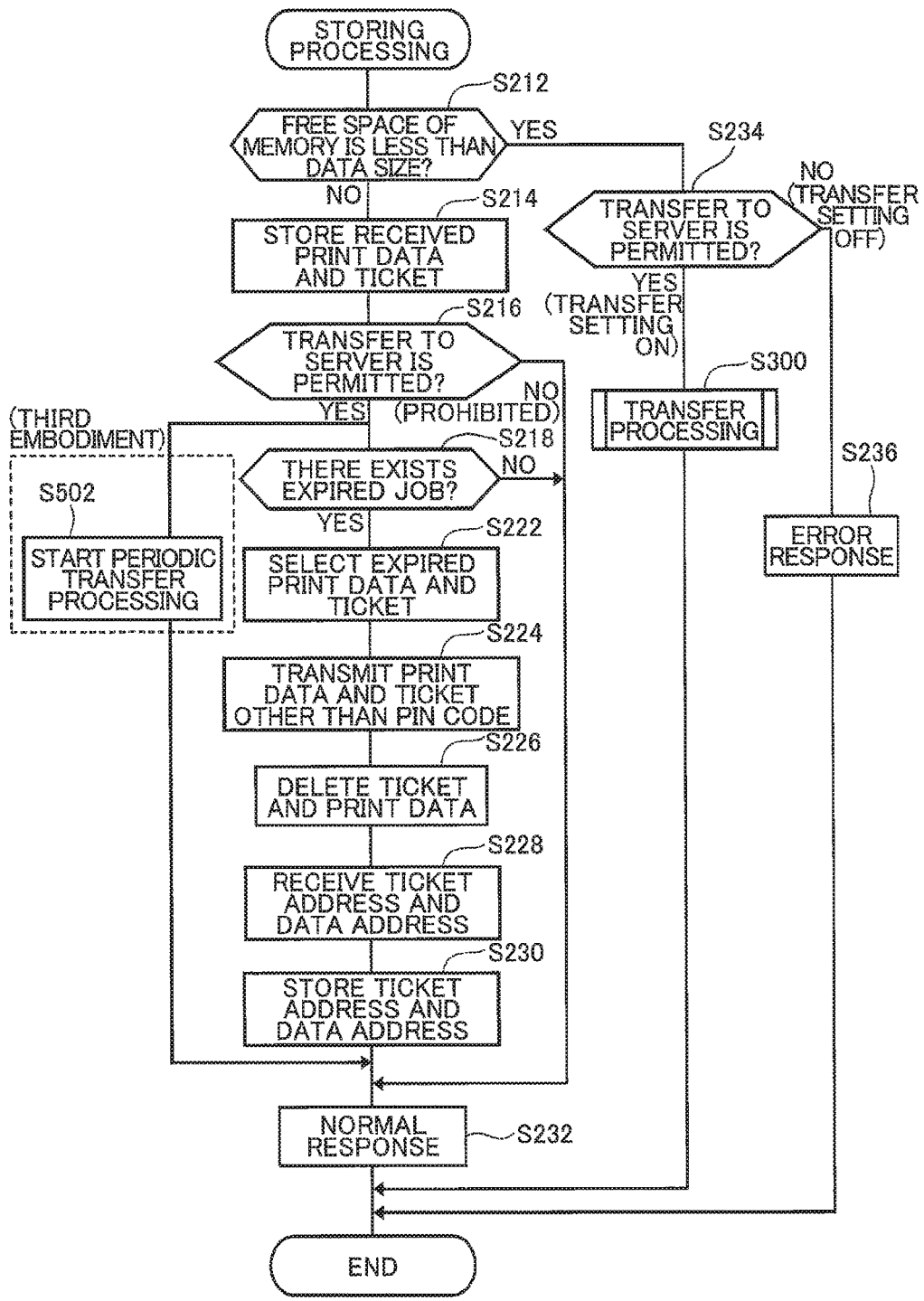
FIG. 4 is a flowchart of the storing processing according to the first embodiment.

The following describes the storing processing of T200 in FIG. 3 performed by the print system 2 in the first embodiment with reference to FIG. 4. FIG. 4 is a flowchart of the storing processing. The storing processing is processing for storing print data that expresses an image to be printed by the secure printing in the printer 300 or the mediation server 200. In the storing processing, received print data is stored in the printer 300 when the printer 300 can store the data, or stored in the mediation server 200 when the printer 300 cannot store the data. S502, which is processing of a third embodiment, will be described later.

In S212, the CPU 322 of the printer 300 compares a data size of print data and a free space of the memory 324 to determine whether or not the free space of the memory 324 is smaller than the data size. When the free space is smaller than the data size (YES in S212), the CPU 322 advances to S234. Otherwise, when the free space is larger than or equal to the data size (NO in S212), the CPU 322 advances to S214.

In S214, the CPU 322 stores the ticket and the print data received from the PC 100 into the memory 324. The CPU 322 also generates a job ID, and stores the job ID in the job table 327 by associating the job ID with a value "local" of a storage location, a PIN code included in the ticket, and a storage time of the ticket and the print data. Here, the "local" of the storage location shows that the ticket and the print data are stored in the memory 324 of the printer 300. The ticket and the print data stored in the memory 324 are not acquired from the mediation server 200 but acquired from the memory 324 in the printing processing described later. When acquiring the ticket and the print data from the mediation server 200, the printer 300 needs to perform communication through the Internet 6. This, in general, requires a longer time period than when they are acquired from the internal memory 324 of the printer 300. Accordingly, by storing the ticket and print data in the memory 324 of the printer 300, a time period required for the entire printing processing can be shortened as compared to the case where they are stored in the mediation server 200.

In S216, the CPU 322 determines whether or not the transfer of a ticket and print data received from an external device, such as the PC 100, to the mediation server 200 is permitted. When a value of the transfer setting st stored in the memory 324 is "ON", the CPU 322 determines that the transfer is permitted (YES in S216), and advances to S218. On the other hand, when the value of the transfer setting st is "OFF", the CPU 322 determines that the transfer is prohibited (NO in S216), and advances to S232. For example, when the mediation server 200 is attacked by an external device, a ticket or print data stored in the mediation server 200 may be leaked. In such a case, if the transfer setting st is "OFF", the risk of leakage of a ticket or print data to the outside can be reduced. For the above reason, for a printer that frequently prints a highly confidential image, it is highly likely that a manager of the printer sets the transfer setting st to "OFF".

In S218, the CPU 322 determines whether or not there exist, in the memory 324, a ticket and print data whose storage period has expired. More specifically, the CPU 322 extracts a job ID whose elapsed period from a corresponding storage time to a current time is larger than or equal to a predetermined period among job IDs stored in the job table 327. The predetermined period is, for example, one hour. When one or more job IDs are extracted, the CPU 322 determines that there exist a ticket and print data whose storage period has expired (that is, a ticket and print data which have been stored in the memory 324 for the predetermined period or longer) (YES in S218), and advances to S222. On the other hand, when no job ID is extracted, the CPU 322 determines that there does not exist any ticket or print data whose storage period has expired (NO in S218), and advances to S232.

In S222, the CPU 322 selects the ticket and print data whose storage period has expired as a target of processing from S224 to S230. When a plurality of sets of tickets and print data are selected as targets for the processing, the processing from S224 to S230 is repeated for the plurality of sets.

In S224, the CPU 322 transfers the ticket and print data as a target of the processing to the mediation server 200. However, the CPU 322 does not transfer a PIN code in the information included in the ticket to the mediation server 200. The PIN code, which is highly confidential information as described above, is not preferably transmitted from the CPU 322 to an external device. Accordingly, the CPU 322 transmits the ticket excluding the PIN code to the mediation server 200 in order to maintain confidentiality. In a modification, the CPU 322 may transfer a ticket including a PIN code to the mediation server 200.

In S226, the CPU 322 deletes the ticket and print data transferred in S224 from the memory 324, and deletes the storage time from the job table 327. However, the CPU 322 does not delete and continues to store a corresponding PIN code in the job table 327. The CPU 322 changes a value of the storage location in the job table 327 corresponding to the deleted ticket and print data from "local" to "cloud".

The mediation server 200 which has received the ticket and print data from the printer 300 stores the ticket and the print data into the memory 224. After storing the ticket and the print data, the mediation server 200 transmits a ticket address and a data address. Here, the ticket address is a URL showing a stored position of the ticket in the memory 224, and the data address is a URL showing a stored position of the print data in the memory 224 to the printer 300. In S228, the CPU 322 of the printer 300 receives the ticket address and the data address from the mediation server 200. In S230, the CPU 322 stores the received ticket address and the data address in the job table 327 by associating them with the job ID corresponding to the ticket and the print data transmitted to the mediation server 200. In this manner, the printer 300 can store the ticket and print data whose storage period has expired into the mediation server 200.

In the printing processing described later, when executing printing in accordance with print data stored in the memory 324, the printer 300 deletes the print data from the memory 324. When a ticket and print data whose storage period has expired are stored in the memory 324, there is the possibility that the user forgets to instruct execution of printing the print data. As described above, when a ticket and print data are stored in the memory 324 of the printer 300, a time period required for the entire printing processing is reduced as compared to the case where they are stored in the mediation server 200. For this reason, when print data, for which execution of printing is more easily instructed, is stored in the memory 324, usability for the user is high. Accordingly, when the printer 300 transmits a ticket and print data whose storage period has expired to the mediation server 200 to increase a free space of the memory 324, newly received ticket and print data can be stored in the memory 324. For this reason, usability for the user can be improved further.

In S232, the CPU 322 transmits, to the PC 100, a normal response indicating that the ticket and print data received from the PC 100 are stored normally in the printer 300 or the mediation server 200. The CPU 322 terminates the storing processing in response to the completion of the processing of S232.

As described above, when a free space of the memory 324 is smaller than data size (YES in S212), the CPU 322 advances to S234. In S234, the CPU 322 determines whether or not transfer of a ticket and print data received from an external device, such as the PC 100, to the mediation server 200 is permitted. Specific processing is similar to that in S216. The CPU 322 advances to S300 when the transfer to the mediation server 200 is permitted (YES in S234), or advances to S236 when the transfer is prohibited (NO in S234).

In S300, the CPU 322 executes transfer processing for transferring the ticket and print data received from the PC 100 to the mediation server 200. In S236, the CPU 322 transmits, to the PC 100, an error response indicating that the ticket and print data cannot be stored in the printer 300 or the mediation server 200. The CPU 322 terminates the storing processing in response to the completion of the processing of S300 and S232.

(Transfer Processing)

Figure 5:
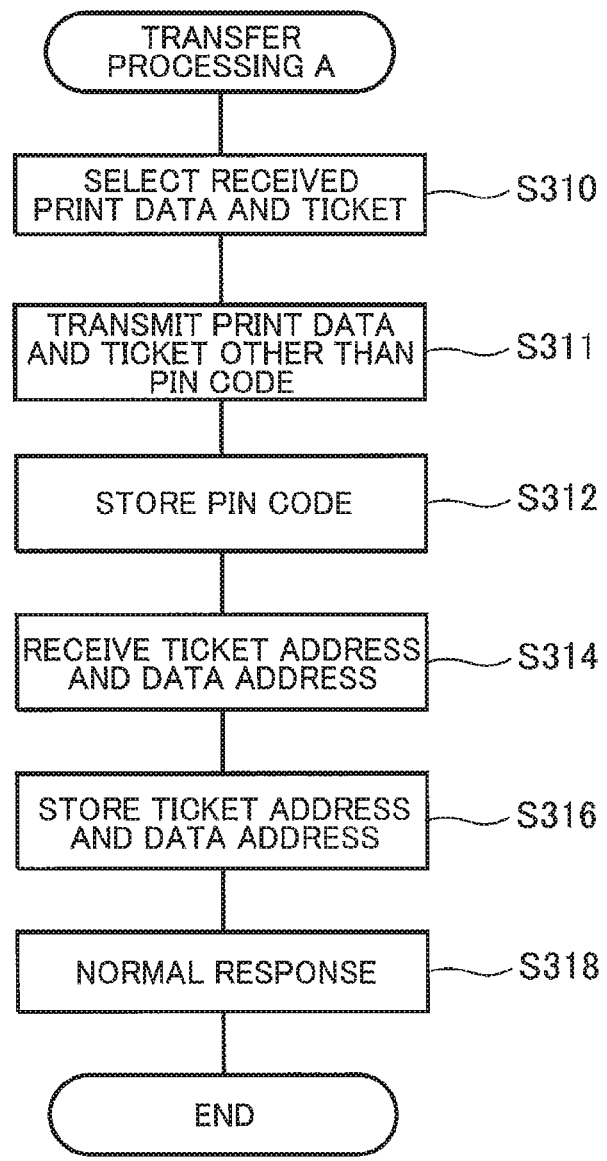
FIG. 5 is a flowchart of transfer processing A according to the first embodiment.

The following describes transfer processing A performed by the print system 2 in the first embodiment with reference to FIG. 5. FIG. 5 is a flowchart of the transfer processing A. The transfer processing A is processing for transferring the ticket and print data received from the PC 100 in T170 (FIG. 3) to the mediation server 200. That is, when the memory 324 does not have a free space for storing the print data received from the PC 100, the printer 300 transfers a ticket and print data that cannot be stored to the mediation server 200, so that the secure printing can be executed.

In S310, the CPU 322 of the printer 300 selects the ticket and print data received from the PC 100 in T170 as described above as a target of processing from S311 to S316. In S311, the CPU 322 transfers a ticket excluding a PIN code and print data to the mediation server 200, like in S224 (FIG. 4). In S312, the CPU 322 stores the PIN code which was not transferred to the mediation server 200 in S312 in the job table 327 by associating the PIN code with a job ID corresponding to the ticket and print data that are transmitted to the mediation server 200.

Upon receiving the ticket and the print data, the mediation server 200 stores them in the memory 224, and transmits a ticket address which is a URL showing a stored position of the ticket in the memory 224 and a data address which is a URL showing a stored position of the print data in the memory 224 to the printer 300. In S314, the CPU 322 of the printer 300 receives the ticket address and the data address from the mediation server 200 like in S228 (FIG. 4). In S316, the CPU 322 stores, in the job table 327, the received ticket address and data address in a manner associating them with a job ID corresponding to the ticket and print data transmitted to the mediation server 200, like in S230 (FIG. 4). The CPU 322 discards the ticket and the print data received in T170 (FIG. 3) without storing them in the memory 324 in response to the completion of the processing of S316.

In S318, the CPU 322 transmits, to the PC 100, a normal response indicating that the ticket and the print data are stored normally in the printer 300 or the mediation server 200, like in S232 (FIG. 4). The transfer processing A is terminated in response to the completion of the processing of S318.

(Printing Processing)

Figure 6:
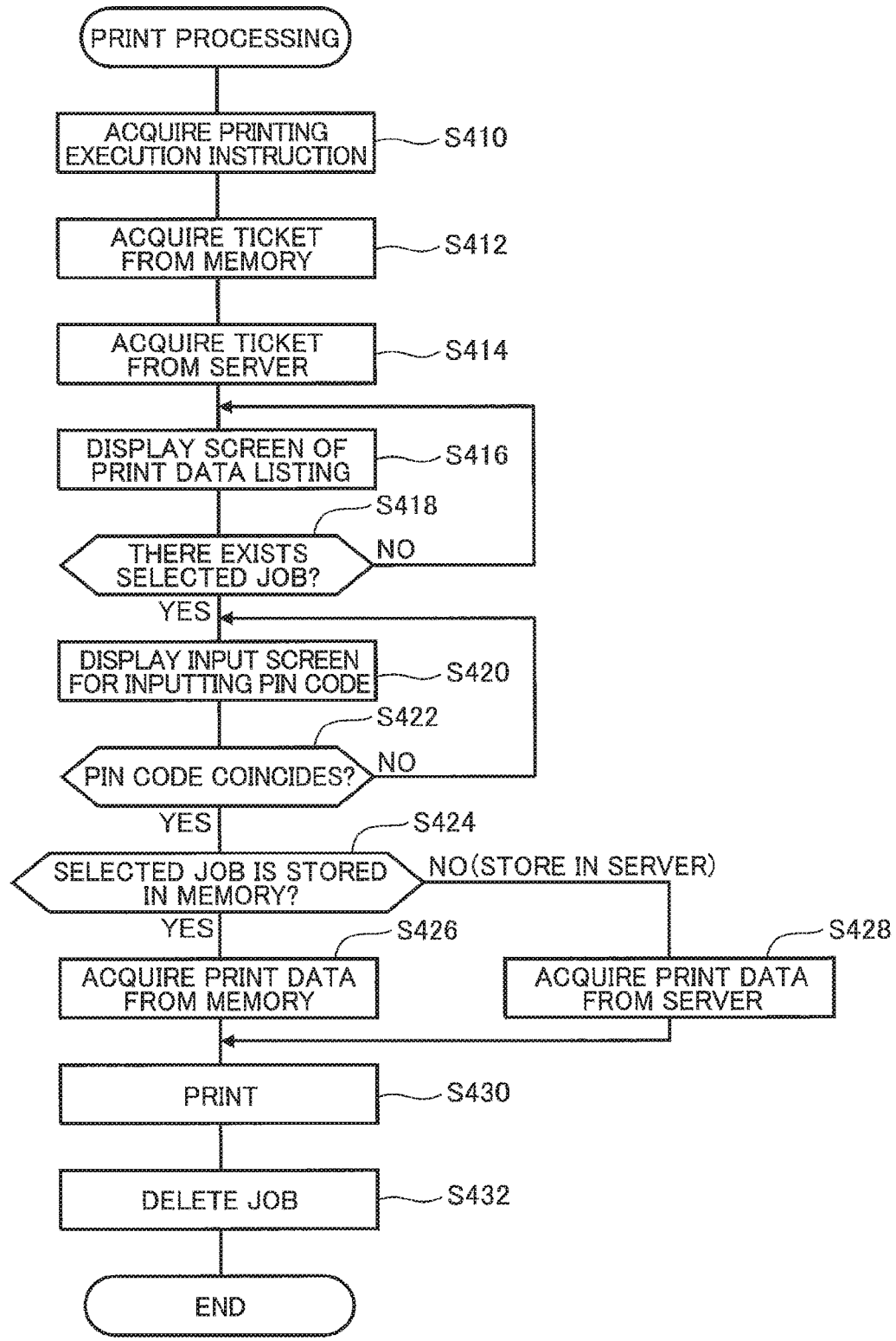
FIG. 6 is a flowchart of printing processing according to the first embodiment.

The following describes the printing processing performed by the print system 2 in the first embodiment with reference to FIG. 6. FIG. 6 is a flowchart of the printing processing. The printing processing is processing for allowing the printer 300 to execute the secure printing in accordance with print data stored in the printer 300 or the mediation server 200.

In S410, the CPU 322 of the printer 300 acquires a printing execution instruction when the user selects execution of printing by the secure printing by operating the display device 140 and the operation device 150. The CPU 322 acquires all tickets stored in the memory 324 of the printer 300 in S412 by acquiring the printing execution instruction. In the state shown in FIG. 1, the CPU 322 acquires the ticket tc1 from the memory 324 in S412.

In S414, the CPU 322 acquires all tickets stored in the mediation server 200. More specifically, the CPU 322 extracts a job ID associated with "cloud" from among values of storage locations stored in the job table 327. The CPU 322 makes an access to the mediation server 200 by using a ticket address associated with the job ID to acquire a corresponding ticket from the mediation server 200. In the state shown in FIG. 1, the CPU 322 acquires the ticket tc2 from the mediation server 200 by using a ticket address tURL2 in S414.

In S416, the CPU 322 displays a screen of a list of print data stored in the printer 300 and the mediation server 200, and receives a selection of print data that expresses an image for which printing is to be executed from the user. The screen of the list includes a file name of print data included in the ticket acquired in S412 and S414 by the printer 300. In S418, the CPU 322 determines whether or not a selection is received from the user on the screen of the list. When the selection is received (YES in S418), the CPU 322 advances to S418. On the other hand, if no selection is made (NO in S418), the CPU 322 awaits a user selection.

In S420, the CPU 322 receives input of a PIN code from the user by displaying an input screen for inputting a PIN code on the display device 340. When a PIN code is input on the input screen, the CPU 322 determines, in S422, whether or not the input PIN code matches with a PIN code stored in the job table 327 in a manner associated with a job ID (selected job ID) of print data selected in S418. When the PIN codes match with each other (YES in S422), the CPU 322 advances to S424. When the PIN codes do not match with each other (NO in S422), the CPU 322 returns to S420. When cancellation is instructed on the input screen, the CPU 322 determines that the printing of an image according to the corresponding print data is cancelled (not shown), and the printing processing is terminated.

In S424, the CPU 322 determines whether or not print data corresponding to the selected job ID is stored in the memory 324 of the printer 300. When a value of a storage location corresponding to the job ID is "local", the CPU 322 determines that the print data is stored in the memory 324 (YES in S424), and advances to S426. On the other hand, when the value of the storage location corresponding to the job ID is "cloud", the CPU 322 determines that the print data is not stored in the memory 324 (that is, stored in the mediation server 200) (NO in S424), and advances to S428.

In S426, the CPU 322 acquires print data corresponding to the selected job ID from the memory 324 of the printer 300. For example, when the selected job ID is the job ID jb1, a value of the corresponding storage location is "local". Accordingly, the CPU 322 acquires the print data pimg1 from the memory 324 in S426.

In S428, the CPU 322 makes an access to the mediation server 200 by using a data address associated with the selected job ID in the job table 327 so as to acquire the corresponding print data. For example, when the selected job ID is the job ID jb2, a value of the corresponding storage location is "cloud". Accordingly, the CPU 322 acquires the print data pimg2 from the mediation server 200 by using a data address iURL2 in S428.

In S430, the CPU 322 supplies the print data acquired in S426 or S428 to the printing execution device 360, and causes the printing execution device 360 to execute printing of an image represented by the print data. The CPU 322 causes the printing execution device 360 to print the image as many as a designated number of prints included in a ticket corresponding to the selected job ID among the tickets acquired in S412 and S414. In this manner, the user can allow the CPU 322 to execute printing (the secure printing) of an image represented by the print data stored in the printer 300 or the mediation server 200.

In S432, the CPU 322 deletes a job corresponding to the image printed in S430 from the job table 327. When the print data and the ticket expressing the image are acquired from the memory 324 of the printer 300, the CPU 322 deletes the print data and the ticket from the memory 324. When print data and a ticket are acquired from the mediation server 200, the CPU 322 transmits a request for deleting the print data and the ticket to the mediation server 200. Accordingly, in the state shown in FIG. 1, when the print data that expresses an image printed in S430 is the print data pimg1, the CPU 322 deletes the job ID jb1, the value "local" of the storage location, the PIN code pin1, and the storage time tm1, and deletes the print data pimg1 and the ticket tc1 from the memory 324. When the print data showing the image printed in S430 is the print data pimg2, the CPU 322 deletes the job ID jb2, the value "cloud" of the storage location, the data address iURL2, the ticket address tURL2, and the PIN code pin2 from the job table 327, and transmits a request for deleting the print data pimg2 and the ticket tc2 to the mediation server 200. The mediation server 200 having received the request deletes the print data pimg2 and the ticket tc2 from the memory 224. In response to the completion of the processing of S432, the printing processing is terminated.

Second Embodiment

Next, following describes the print system 2 in the second embodiment. In the second embodiment, the content of the transfer processing is different from that of the first embodiment. The configuration and the processing other than the transfer processing of the print system 2 are similar to those of the first embodiment, and will be omitted from the description.

(Transfer Processing)

Figure 7:
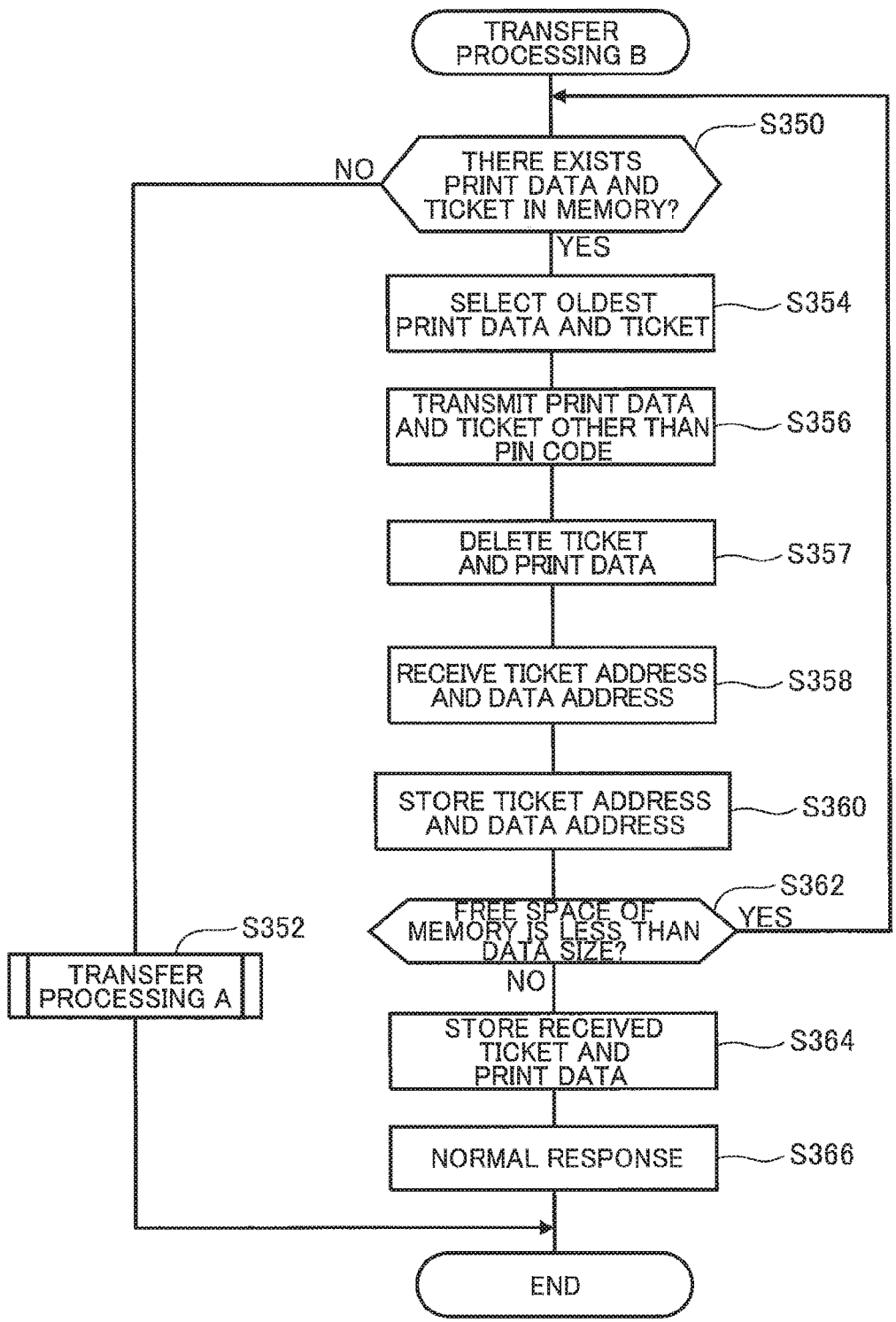
FIG. 7 is a sequence diagram of transfer processing B according to a second embodiment.

The following describes transfer processing B performed by the print system 2 in the second embodiment with reference to FIG. 7. FIG. 7 is a sequence diagram of the transfer processing B. The transfer processing B is processing for transferring a ticket and print data stored in the memory 324 to the mediation server 200, unlike the transfer processing A. That is, when there is no free space left in the memory 324, the printer 300 transfers a ticket and print data which have already been stored in the memory 324 to the mediation server 200, and stores a ticket and print data received from the PC 100 in T170 (FIG. 3) into the memory 324. In this manner, the secure printing can be executed.

As described above, there is a high possibility that the user instructs the printer 300 to execute the printing of newly received print data, rather than print data which has been stored in the memory 324 of the printer 300 in printing processing described later. Accordingly, the printer 300 transfers the ticket and the print data which have been stored in the memory 324 to the mediation server 200, and stores newly received ticket and print data into the memory 324. In this manner, usability for the user can be further improved.

In S350, the CPU 322 of the printer 300 determines whether or not a ticket and print data have already been stored in the memory 324. More specifically, the CPU 322 extracts a job ID whose corresponding storage location has a value of "local" from job IDs stored in the job table 327. When no job ID is extracted, the CPU 322 determines that no ticket or print data is stored in the memory 324 (NO in S350), and advances to S352.

The CPU 322 executes the transfer processing B when it is determined that there is no free space in the memory 324 (YES in S212 (FIG. 4)). However, the memory 324 is sometimes determined to have no ticket or print data in S350. This happens when, for example, a data size of print data is larger than the entire capacity of the memory 324 for storing data, or when the memory 324 is in use since the CPU 322 is carrying out processing different from the storing processing and the transfer processing in parallel, and, hence, a free space is temporarily in short. That is, even when no ticket or print data is stored in the memory 324, the CPU 322 sometimes cannot store the ticket and the print data in the memory 324. In this case, in S352, the CPU 322 executes the transfer processing A for transmitting a ticket and print data received from the PC 100 to the mediation server 200 in T170 (FIG. 3) on an exceptional basis.

On the other hand, in S350, when one or more job IDs are extracted, the CPU 322 determines that a ticket and print data have already been stored in the memory 324 (YES in S350), and advances to S354. In S354, the CPU 322 selects a ticket and print data which were stored earliest in the memory 324 as a target of processing from S356 to S360 from among tickets and print data stored in the memory 324. More specifically, the CPU 322 specifies the oldest storage time among storage times stored in the job table 327. The CPU 322 selects a ticket and print data corresponding to the specified storage time as a target of processing.

In S356 to S360, the CPU 322 deletes the selected ticket and print data from the memory 327 after transmitting them to the mediation server 200, like in the processing from S224 to S230 (FIG. 4), and stores a ticket address of the ticket and a data address of the print data received from the mediation server 200 into the job table 327.

In S362, the CPU 322 determines whether or not a free space of the memory 324 is smaller than a data size of print data, like in S212 (FIG. 4). When the free space is smaller than the data size (YES in S362), the CPU 322 returns to S350. For example, assume that a data size of print data which was stored earliest is smaller than a data size of the print data received in T170 (FIG. 3). In this case, even if the print data which was stored earliest is stored in the mediation server 200 and deleted from the memory 324 of the printer 300, the free space of the memory 324 is determined to be smaller than the data size of the print data. In this case, the CPU 322 returns to S350, and another piece of print data needs to be transferred to the mediation server 200.

On the other hand, when the free space is larger than or equal to the data size (NO in S362), the CPU 322 advances to S364. In S364, the CPU 322 stores a ticket and print data received from the PC 100 into the memory 324, and transmits a normal response to the PC 100 in S366. Specific processing is similar to that in S214 and S232 (FIG. 4). Accordingly, in the transfer processing B, the CPU 322 transfers tickets and print data to the mediation server 200 in the order of earlier storage times, and stores a ticket and print data which are received comparatively newly into the memory 327. Upon completion of the processing of S352 or S366, the transfer processing B is terminated.

Third Embodiment

Next, a description will be given of the print system 2 in a third embodiment. In the third embodiment, part of the storing processing is different from that of the first embodiment. The configuration and the processing except for part of the storing processing of the print system 2 are similar to those in the first embodiment, and will be omitted from the description.

(Storing Processing)

The following describes the storing processing performed by the print system 2 in the third embodiment with reference to FIG. 4. In the storing processing of the first embodiment, the printer 300 determines whether or not a ticket and print data whose storage period has expired exist in a stage where print data is received. Accordingly, the tickets and print data whose storage periods have expired are continuously stored into the memory 324 until the printer 300 newly receives print data. On the other hand, in the storing processing of the third embodiment, the printer 300 periodically determines whether or not storage deadlines of tickets and print data have passed after storing the tickets and the print data into the memory 324. When the storage deadline has passed, the printer 300 transfers the ticket and the print data to the mediation server 200.

In the storing processing of the third embodiment, after YES in S216, processing of S502 is executed in place of the processing from S218 to S230. The other processing is similar to that in the first embodiment, and will be omitted from the description. In S502, the printer 300 starts periodic transfer processing. The periodic transfer processing is processing which is executed in parallel with and separately from the registration processing, the storing processing, the transfer processing, and the printing processing. Accordingly, the periodic transfer processing is continuously executed even during execution of, for example, the registration processing. When the periodic transfer processing is started, the printer 300 advances to S232 before the processing is completed.

(Periodic Transfer Processing)

Figure 8:
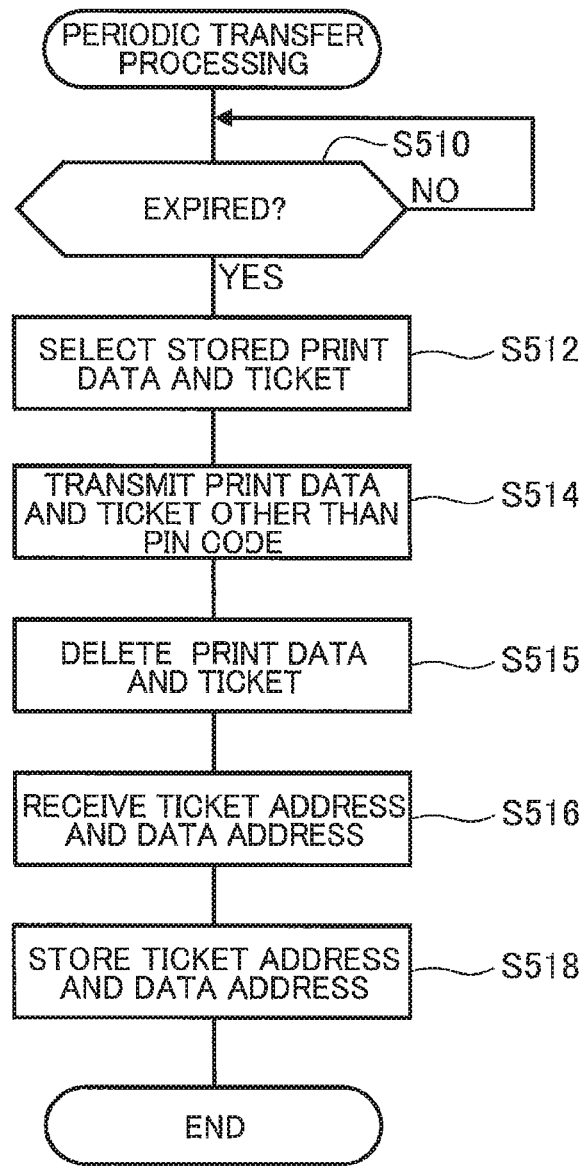
FIG. 8 is a flowchart of periodic transfer processing according to a third embodiment.

The following describes the periodic transfer processing performed by the print system 2 of the third embodiment with reference to FIG. 8. The periodic transfer processing is processing of transferring corresponding ticket and print data to the mediation server 200 when a storage deadline has passed as described above.

In S510, the CPU 322 of the printer 300 determines whether or not a storage deadline of the ticket and the print data stored in the memory 324 in S214 is passed. The CPU 322 determines that the storage deadline has passed when an elapsed period from a storage time at which the ticket and the print data were stored in the memory 324 until a current time is larger than or equal to a predetermined period (YES in S510), and advances to S512. On the other hand, the CPU 322 determines that the storage deadline has not passed when the elapsed period is smaller than the predetermined period (NO in S510), and waits until the storage deadline passes.

In S512, the CPU 322 selects a ticket and print data whose storage deadline has passed in S510 as a target of processing from S514 to S518. In S514 to S518, the CPU 322 transmits the selected ticket and print data to the mediation server 200, and then deletes them from the memory 327 in a similar manner as the processing from S224 to S230 (FIG. 4). The CPU 322 stores a ticket address of the ticket and a data address of the print data received from the mediation server 200 into the job table 327.

As described above, in the first to third embodiments, the printer 300 transmits the print data received from the PC 100 to the mediation server 200, and acquires the print data from the mediation server 200 in response to the receiving of a printing instruction. In this manner, the printer 300 can print a specific image represented by the print data even if the print data is not stored. Accordingly, even when a free space for storing image data is not left in the memory 324 of the printer 300, the user can allow a desired image to be printed by the printer 300 in response to input of a PIN code to the input screen displayed on the display device 340 of the printer 300.

(Correspondence Relationships)

The PC 100 is an example of the "terminal device". The mediation server 200 is an example of the "external device". The printer 300 is an example of the "printing apparatus".

The print data is an example of the "specific image data". The print data selected in S354 in FIG. 7 is an example of the "first image data". The print data received in T170 in FIG. 3 is an example of the "second image data" and the "fourth image data". The print data selected in S222 in FIG. 4 is an example of the "third print data". The PIN code inputted in S420 in FIG. 6 is an example of the "authentication information". The PIN code included in the ticket received in T170 in FIG. 3 is an example of the "predetermined information".

The display device 340 and the operation device 350 are an example of the "input interface". The printing execution device 360 is an example of the "print device". The memory 324 is an example of the "memory".

T170 in FIG. 3 is an example of the "receiving process". S311 in FIG. 5 and S356 in FIG. 7 are an example of the "transmitting process". S416 and S420 in FIG. 6 are an example of the "receiving process". S426 and S428 in FIG. 6 are an example of the "acquiring process". T174 in FIG. 3 and S430 in FIG. 6 are an example of the "printing process".

S212 and S234 in FIG. 4 are an example of the "determining process"". S214 in FIG. 4 is an example of the "storing process". S424 in FIG. 6 is an example of the "determining process". S357 in FIG. 7 is an example of the "deleting process". S218 in FIG. 4 and S510 in FIG. 8 are an example of the "determining process". S224 in FIG. 4 and S514 in FIG. 8 are an example of the "transmitting process". S226 in FIG. 4 and S515 in FIG. 8 are an example of the "deleting process". S422 in FIG. 6 is an example of the "determining process". S214 in FIG. 4 and S311 in FIG. 5 are an example of the "storing process".

The following describes the embodiments of the present disclosure. The embodiments are merely examples, and do not limit the scope of the claims. The techniques described in the claims include various modifications and variations of the embodiments exemplified above.

(First Modification)

In the first to third embodiments, the printer 300 determines whether or not there is a free space in the memory 324 in the storing processing (S212), and then determines whether or not transfer of a ticket and print data to the mediation server 200 is permitted (S234). However, instead of the above, the configuration may be such that the printer 300 determines whether or not the transfer of a ticket and print data to the mediation server 200 is permitted before determining whether or not there is a free space in the memory 324. In general, the printing apparatus needs to perform a determining process in which it is determined whether or not a specific condition for transmitting specific image data to an external device is satisfied.

Figure 9:
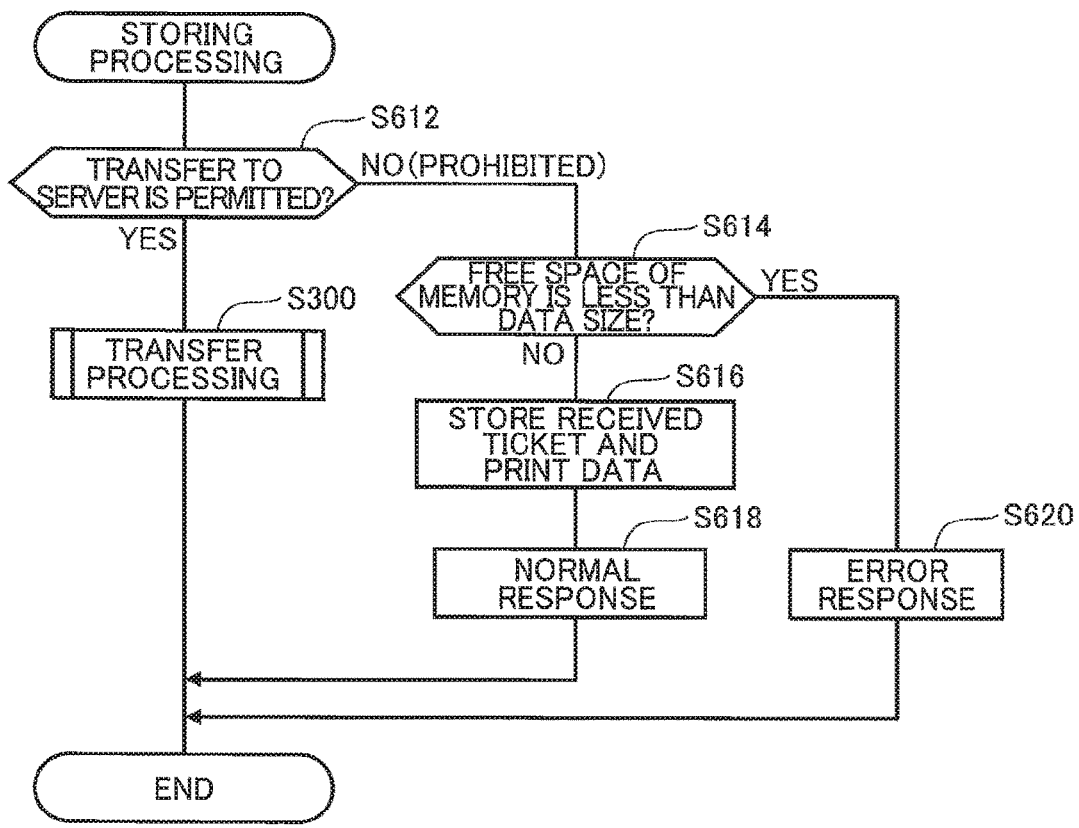
FIG. 9 is a flowchart of storing processing according to a first modification.

The following describes the storing processing performed by the print system 2 in a first modification with reference to FIG. 9. FIG. 9 is a flowchart of the storing processing of the first modification.

In S612, the CPU 322 of the printer 300 determines whether or not transfer of a ticket and print data received from an external device, such as the PC 100, to the mediation server 200 is permitted. Specific processing is similar to that in S216 (FIG. 4). When the transfer to the medication server 200 is permitted (YES in S612), the CPU 322 advances to S300. In S300, the CPU 322 executes the transfer processing. The transfer processing executed in this step may be the transfer processing A executed in the first embodiment or the transfer processing B executed in the second embodiment.

On the other hand, in S612, when the transfer to the mediation server 200 is prohibited (NO in S612), the CPU 322 advances to S614. In S614, the CPU 322 determines whether or not a free space of the memory 324 is smaller than a data size of the print data received in T170 (FIG. 3). Specific processing is similar to S212 (FIG. 4). When the free space is larger than or equal to the data size (NO in S614), the CPU 322 advances to S616.

In S616, the CPU 322 stores the ticket and the print data received from the PC 100 into the memory 324. Specific processing is similar to that in S214 (FIG. 4). Upon storing the ticket and the print data into the memory 324, the CPU 322 transmits a normal response to the PC 100 in S618.

On the other hand, in S614, when the free space of the memory 324 is smaller than the data size of the print data (YES in S614), the CPU 322 advances to S620. In S620, the CPU 322 transmits an error response to the PC 100. The CPU 322 terminates the storing processing in response to the completion of any of the processing S300, S618, and S620.

In the present modification, S612 is an example of the "determining process" in which it is determined whether or not a specific condition for transmitting specific image data to an external device is satisfied. S616 is an example of the "storing process".

(Second Modification)

In the first to third embodiment described above, the printer 300 determines whether or not a specific condition is satisfied in the storing processing, and then stores a ticket and print data in the printer 300 or the mediation server 200. However, instead of the above, the configuration may be such that the printer 300 stores a ticket and print data into the memory 324 of the printer 300 upon receiving the ticket and the print data without determining whether or not a specific condition is satisfied.

In this case, for example, the CPU 322 of the printer 300 executes S214 without executing S212 in the storing processing of FIG. 4. After storing a ticket and print data into the memory 324 in S214, the printer 300 executes processing of S502 and S218 and subsequent processing without executing S216. In the present modification, S214 is an example of the "storing process", and S218 and S510 (FIG. 8) are an example of the "determining process" in which it is determined whether the first time period exceeds a threshold.

The printer 300 may transmit a ticket and print data to the mediation server 200 in response to the receiving of the ticket and the print data without determining whether or not a specific condition is satisfied. In this case, for example, in T172 of the storing processing in FIG. 3, the printer 300 determines that an image represented by the print data pimg1 needs to be printed by the secure printing (YES in T172) since the PIN code pin1 is included in the ticket tc1, and executes the transfer processing A (FIG. 5) without printing the image. In general, the printing apparatus does not need to perform the determining process in which it is determined whether or not a specific condition for transmitting specific image data to an external device is satisfied.

(Third Modification)

In the first to third embodiments described above, the printer 300 starts the storing processing by receiving the local printing operation for executing the local printing in T114 in FIG. 3. However, instead of the above, the configuration may be such that the printer 300 starts the storing processing by accepting the normal printing operation for executing the normal printing. In this case, for example, the printer 300 accepts the normal printing operation when the user selects the printing of the image data img1 by using an image browsing program (not shown) included in the program 126.

Upon accepting the normal printing operation, the PC 100 starts a driver program (not shown) and displays the selection screen SC3 on the display device 140. Since the image data img1 to be printed has already been determined, the selection screen SC3 does not include a box for determining image data. Since the driver program is a program based on the capability information of the printer 300, the selection screen SC3 is configured so that a printing condition made up of a paper size and the number of copies can be selected within a range of the capability information of the printer. Upon receiving selections of a printing condition and a PIN code on the selection screen SC3, the PC 100 converts the image data img1 by using the driver program 128, and generates the print data pimg1 having a data format which can be interpreted by the printer 300. The PC 100 uses the driver program 128 to transmit a normal printing instruction including the print data pimg1, the printing condition, and the PIN code to the printer 300. Upon receiving the normal printing instruction, the printer 300 executes the processing of T172 and subsequent processing. In general, the printing apparatus needs to perform a receiving process in which specific image data from the terminal device is received.

(Fourth Modification)

In the first to third embodiments described above, the printer 300 determines, in S212 in FIG. 4, whether or not a free space which is large enough to store received print data is left in the memory 324. However, instead of the above, the configuration may be such that the printer 300 determines whether or not a printing instruction received from the PC 100 is the normal printing instruction or the local printing instruction. As described above, the local printing is a service provided by a vendor of the mediation server 200, whereas the normal printing is not a service provided by a vendor of the mediation server 200. Accordingly, in this case, when the received printing instruction is the normal printing instruction, the printer 300 advances to S214, and stores print data and a ticket in the memory 324 of the printer 300. Otherwise, when the printing instruction is the local printing instruction, the printer 300 advances to S300, and executes the transfer processing. In general, the printing apparatus needs to perform the determining process in which it is determined whether or not a specific condition for transmitting specific image data to the external device is satisfied.

(Fifth Modification)

In the first to third embodiments described above, the printer 300 determines whether or not transfer of a ticket and print data to the mediation server 200 is permitted on the basis of the transfer setting st stored in the printer 300 in S234 and S216 in FIG. 4. However, instead of the above, the configuration may be such that the PC 100 displays the selection screen SC3 including a box for selecting whether or not the transferring to the mediation server 200 is permitted in T164, and the printer 300 determines whether or not the transfer is permitted on the basis of a result of selection made by the user. In general, the printing apparatus needs to perform the determining process in which it is determined whether or not a specific condition for transmitting specific image data to the external device is satisfied.

(Sixth Modification)

In the first to third embodiments described above, in T172 in FIG. 3, when a PIN code is included in the ticket received from the PC 100 (YES in T172), the printer 300 executes the storing processing in T200. The printer 300 also executes printing in accordance with print data corresponding to the PIN code inputted by the user in S422 in FIG. 6. However, instead of the above, the configuration may be such that the printer 300 executes the storing processing when user information is included in a ticket in place of a PIN code, and executes printing in accordance with the corresponding print data when the user logs in the printer 300 by using the user information.

In this case, for example, the printer 300 also stores, in the memory 324, the user information u1 that the mediation server 200 stores by associating the information with the printer information p1 of the printer 300. In the storing processing in FIG. 3, the printer 300 determines whether or not the user information u1 is included in the ticket received from the PC 100 in T172. When the user information u1 is included (YES in T172), the printer 300 executes the storing processing (T200).

In the printing processing in FIG. 6, the printer 300 first accepts the user logging in the printer 300. Upon accepting the login of the user in response to input of the user information u1, the printer 300 displays a screen of a list of print data which are stored in the printer 300 and the mediation server 200 and associated with the user information u1 in S416. When the user selects print data on the screen of the list, the printer 300 executes processing of S424 and subsequent processing without executing S420 and S422, and executes printing in accordance with the selected print data. In the present modification, the user information u1 inputted to the printer 300 by the user in the printing processing is an example of the "authentication information", and the user information u1 included in a ticket which is received by the printer 300 from the PC 100 in the storing processing is an example of the "predetermined information".

(Seventh Modification)

The processing of the first to third embodiments described above is performed by the CPU 122 of the PC 100, the CPU 222 of the mediation server 200, and the CPU 322 of the printer 300 in accordance with software (that is, the programs 126, 226, and 326). Instead of the above, the configuration may be such that the processing is performed by hardware, such as a logic circuit.

The technical elements described in the present description and the accompanying drawings exert technical utility alone or in a variety of combinations, and are not limited to the combinations described in the claims at the time of filing. The techniques exemplified in the present description or the accompanying drawings achieve a plurality of objects at the same time, and are technically useful by achieving one of such objects itself.

While the description has been made in detail with reference to specific embodiments thereof, it would be apparent to those skilled in the art that various changes and modifications may be made therein without departing from the spirit and scope of the above described embodiments.

What is claimed is:

1. A printing apparatus configured to communicate with a terminal device via a local area network and an external device via Internet, the printing apparatus comprising:
   an input device;
   a network interface;
   a print device configured to perform printing; and
   a controller configured to perform:
      receiving specific image data representing a specific image from the terminal device using the network interface via the local area network;
      determining whether inputting a print instruction to the input device is required for printing the specific image;
      when it is determined that inputting a print instruction to the input device is not required for printing the specific image,
         causing the print device to print the specific image based on the specific image data received from the terminal device without transmitting the specific image data to the external device; and
      when it is determined that inputting a print instruction to the input device is required for printing the specific image,
         transmitting the specific image data being received from the terminal device using the network interface via the local area network to the external device via the Internet using the network interface,
         receiving the print instruction via the input device after transmitting the specific image data,
         acquiring the specific image data from the external device via the network interface in response to the receiving the print instruction, and
         causing the print device to print the specific image based on the specific image data acquired from the external device.

2. The printing apparatus according to claim 1, further comprising a memory; and
   wherein, when it is determined that inputting a print instruction to the input device is required for printing the specific image, the controller is further configured to perform:
      determining whether a specific condition is satisfied;
      executing the transmitting the specific image data to the external device when it is determined that the specific condition is satisfied;
      when it is determined that the specific condition is unsatisfied, storing the specific image data in the memory without transmitting the specific image data to the external device;
      in response to the receiving the print instruction via the input device, determining whether the specific image data is stored in the memory;
      executing the acquiring the specific image data when the specific image data is absent in the memory; and
      when the specific image data is stored in the memory, acquiring the specific image data from the memory.

3. The printing apparatus according to claim 2, wherein the specific image data has a data size; and
   wherein the specific condition includes a condition that the memory has a free area less than the data size.

4. The printing apparatus according to claim 3, wherein the memory stores setting information indicating one of a permission setting and a prohibition setting, the permission setting permitting the transmitting the specific image data to the external device, the prohibition setting prohibiting the transmitting the specific image data to the external device; and
   wherein the specific condition includes a condition that the memory has the free area less than the data size and the setting information indicates the permission setting.

5. The printing apparatus according to claim 2, wherein the memory stores one of a permission setting and a prohibition setting, the permission setting permitting the transmitting the specific image data to the external device, the prohibition setting prohibiting the transmitting the specific image data to the external device; and
   wherein the specific condition includes a condition that the setting information indicates the permission setting.

6. The printing apparatus according to claim 2, wherein the specific image data includes a first image data and a second image data, the first image data being received via the network interface and stored in the memory, the second image data being received via the network interface after receipt of the first image data; and
   wherein the controller is further configured to perform:
      transmitting the first image data in the memory to the external device in response to the receipt of the second image data, when the specific condition is satisfied;
      deleting the first image data from the memory in response to the transmitting the first image data to the external device; and
      storing the second image data in the memory in response to the receipt of the second image data.

7. The printing apparatus according to claim 2, wherein the controller is further configured to perform:
      determining whether a first time period exceeds a threshold, the first time period being a period from when the specific image data is stored in the memory;
      transmitting the specific image data to the external device when it is determined that the time period exceeds the threshold; and
      deleting the specific image data from the memory in response to the transmitting the specific image data.

8. The printing apparatus according to claim 7, wherein the specific image data includes third image data and fourth image data, the fourth image data being received via the network interface after receipt of the third image data received via the network interface; and
   wherein, when the fourth image data is received, the controller is further configured to perform:
      in response to storing the third image data in the memory, determining whether a second time period exceeds the threshold, the second time period being a period from when the third image data is stored in the memory;
transmitting the third image data to the external device when the time period exceeds the threshold; and
deleting the third image data from the memory in response to the transmitting the third image data.

9. The printing apparatus according to claim 1, further comprising a memory; and
wherein the controller is further configured to perform:
storing the specific image data in the memory in response to the receiving the specific image data;
determining whether the first time period exceeds a threshold, the first time period being a period from when the specific image data is stored in the memory; and
the transmitting including transmitting the specific image data to the external device when the first time period exceeds the threshold.

10. The printing apparatus according to claim 2, wherein the controller is further configured to perform:
deleting the specific image data from the memory in response to the printing the specific image represented by the specific image data acquired from the memory in the acquiring.

11. The printing apparatus according to claim 1, wherein the print instruction includes authentication information; and
wherein the controller is further configured to perform:
receiving from the terminal device a prescribed information indicating that the inputting the print instruction to the input device is required for printing the specific image;
determining whether the authentication information matches with the prescribed information;
printing the specific image with the print device when the authentication information matches with the prescribed information; and
failing to print the specific image when the authentication information is different from the prescribed information.

12. The printing apparatus according to claim 11, wherein the controller is further configured to perform:
when the authentication information is different from the prescribed information,
failing to acquire the specific image data in the acquiring, and
failing to print the specific image; and
when the authentication information coincides with the prescribed information,
acquiring the specific image data in the acquiring, and
printing the specific image with the print device.

13. The printing apparatus according to claim 11, further comprising a memory; and
wherein the controller is further configured to perform:
storing the prescribed information in the memory in response to the receipt of the prescribed information; and
determining whether the authentication information coincides with the prescribed information stored in the memory.

14. A non-transitory computer readable storage medium storing a set of program instructions installed on and executed by a computer for controlling a printing apparatus configured to communicate with a terminal device via a local area network and an external device via Internet, the printing apparatus comprising:
an input device;
a network interface;
a print device configured to perform printing; and
the program instructions comprising:
receiving specific image data representing a specific image from the terminal device using the network interface via the local area network;
determining whether inputting a print instruction to the input device is required for printing the specific image;
when it is determined that inputting a print instruction to the input device is not required for printing the specific image,
causing the print device to print the specific image based on the specific image data received from the terminal device without transmitting the specific image data to the external device; and
when it is determined that inputting a print instruction to the input device is required for printing the specific image,
transmitting the specific image data being received from the terminal device using the network interface via the local area network to the external device via the Internet using the network interface,
receiving the print instruction via the input device after transmitting the specific image data,
acquiring the specific image data from the external device via the network interface in response to the receiving the print instruction, and
causing the print device to print the specific image based on the specific image data acquired from the external device.

* * * * *